(12) United States Patent
Ichimura

(10) Patent No.: US 9,958,652 B2
(45) Date of Patent: May 1, 2018

(54) IMAGING OPTICAL SYSTEM, IMAGE PROJECTION OPTICAL SYSTEM AND IMAGE PROJECTION APPARATUS

(71) Applicant: CANON KABUSHIKI KAISHA, Tokyo (JP)

(72) Inventor: Junya Ichimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 14/487,640

(22) Filed: Sep. 16, 2014

(65) Prior Publication Data

US 2015/0077848 A1 Mar. 19, 2015

(30) Foreign Application Priority Data

Sep. 18, 2013 (JP) .................................. 2013-193387

(51) Int. Cl.
| | |
|---|---|
| G02B 13/16 | (2006.01) |
| G03B 21/00 | (2006.01) |
| G02B 13/04 | (2006.01) |
| G03B 21/14 | (2006.01) |
| G02B 27/00 | (2006.01) |

(52) U.S. Cl.
CPC ............. *G02B 13/16* (2013.01); *G02B 13/04* (2013.01); *G02B 27/0062* (2013.01); *G03B 21/005* (2013.01); *G03B 21/147* (2013.01)

(58) Field of Classification Search
None
See application file for complete search history.

(56) References Cited

U.S. PATENT DOCUMENTS

| 5,357,289 A | 10/1994 | Konno et al. |
| 5,694,180 A | 12/1997 | Deter et al. |
| (Continued) | | |

FOREIGN PATENT DOCUMENTS

| CN | 1054956 C | 7/2000 |
| CN | 100414433 C | 8/2008 |
| (Continued) | | |

OTHER PUBLICATIONS

European Search Report issued in corresponding counterpart Application No. EP14003181.6 dated Feb. 19, 2015.
(Continued)

*Primary Examiner* — Stephone B Allen
*Assistant Examiner* — James McGee
(74) *Attorney, Agent, or Firm* — Rossi, Kimms & McDowell LLP

(57) ABSTRACT

The imaging optical system makes magnification conjugate side and reduction conjugate side predetermined positions conjugate to each other and forms an intermediate image conjugate to both the predetermined positions. The optical system includes a magnification side positive lens as a first lens disposed on the magnification conjugate side further than an intermediate imaging position, a reduction side positive lens as a third lens disposed on the reduction conjugate side further than the intermediate imaging position, and a negative lens as a second lens disposed between these positive lenses. Conditions of $5<\nu 2-\nu 1<80$, $5<\nu 2-\nu 3<80$, $0.03<N1-N2<1.0$ and $0.03<N3-N2<1.0$ are satisfied where $\nu 1$, $\nu 2$ and $\nu 3$ represent Abbe numbers of materials of the first, second and third lenses, N1, N2 and N3 represent refractive indices of the materials of the first, second and third lenses.

13 Claims, 7 Drawing Sheets

(56) References Cited

U.S. PATENT DOCUMENTS

| | | | |
|---|---|---|---|
| 7,009,765 B2 | 3/2006 | Gohman | |
| 7,159,988 B2 | 1/2007 | Yatsu et al. | |
| 2005/0117123 A1 | 6/2005 | Yatsu et al. | |
| 2008/0285150 A1* | 11/2008 | Souma | G02B 15/161 359/690 |
| 2010/0238416 A1* | 9/2010 | Kuwata | G03B 21/28 353/69 |
| 2013/0229635 A1 | 9/2013 | Lin et al. | |

FOREIGN PATENT DOCUMENTS

| | | |
|---|---|---|
| CN | 1692297 B | 10/2010 |
| CN | 103293642 A | 9/2013 |
| EP | 0662274 B1 | 7/1995 |
| EP | 2899581 A1 | 7/2015 |
| JP | 527345 A | 2/1993 |
| JP | 2006523318 A | 10/2006 |
| JP | 2010244017 A | 10/2010 |
| WO | 9503676 | 2/1995 |
| WO | 2014045596 A1 | 8/2016 |

OTHER PUBLICATIONS

Office Action issued in Chinese Appln. No. 201410466927.4 mailed Apr. 1, 2016. English translation provided.

Office Action issued in Japanese Patent Application No. 2013-193387 dated Jul. 11, 2017.

* cited by examiner though U.S. Pat. Nos. 5,357,289 and 7,009,765 disclose that the aberration corrections are performed in front of and behind the intermediate imaging position, neither of them disclose specific configurations of the optical systems. In addition, in order to provide a high definition image with such imaging optical systems each forming the intermediate image, it is necessary to take into consideration correction of a high-order off-axis aberration and correction of axial (longitudinal) chromatic aberrations which are combined in front of and behind the intermediate imaging position.

IMAGING OPTICAL SYSTEM, IMAGE PROJECTION OPTICAL SYSTEM AND IMAGE PROJECTION APPARATUS

BACKGROUND OF THE INVENTION

Field of the Invention

The present invention relates to an imaging optical system used as an image projection optical system of an image projection apparatus and the like.

Description of the Related Art

Image projection apparatuses are required to have an imaging optical system as a wide-angle-of-view image projection optical system in order to be capable of projecting a larger image at a shorter projection distance. In general, as such a wide-angle-of-view imaging optical system, a so-called retrofocus optical system is used in which a lens having a negative refractive power is disposed on a magnification conjugate side and a lens having a positive refractive power is disposed on a reduction conjugate side.

However, in such a retrofocus imaging optical system, its lens disposed on the magnification conjugate side tends to have a larger diameter as its angle of view increases. This tendency appears especially in cases, such as image projection optical systems, where a long backfocus and a high telecentricity are required. U.S. Pat. Nos. 5,357,289 and 7,009,765 disclose the following imaging optical systems capable of solving this problem.

U.S. Pat. No. 5,357,289 discloses an imaging optical system which causes an entering light to form an intermediate image therein to enable easily ensuring a sufficient backfocus and which performs aberration corrections independently in front of and behind the intermediate image (intermediate imaging position) to provide a satisfactory image quality.

U.S. Pat. No. 7,009,765 discloses an imaging optical system which not only causes an entering light to form an intermediate image therein and performs aberration corrections in front of and behind the intermediate image (intermediate imaging position), but also bends an optical path of the light by a reflective surface to make the optical system compact.

However, al

SUMMARY OF THE INVENTION

The present invention provides an imaging optical system which forms an intermediate image and is capable of providing a high definition image as an image projection optical system and the like. The present invention further provides an image projection apparatus using the imaging optical system.

The present invention provides as an aspect thereof an imaging optical system configured to make a predetermined position on a magnification conjugate side and another predetermined position on a reduction conjugate side conjugate to each other and to form an intermediate image conjugate to both the predetermined positions. The optical system includes a magnification side positive lens disposed on the magnification conjugate side further than an intermediate imaging position where the intermediate image is formed and being convex toward the magnification conjugate side, the intermediate imaging position being located between two points at both of which an off-axis principal ray of a light flux entering the optical system intersects with an optical axis of the optical system, a reduction side positive lens disposed between the two points and on the reduction conjugate side further than the intermediate imaging position and being convex toward the reduction conjugate side, and a negative lens disposed between the magnification side positive lens and the reduction side positive lens. When the magnification side positive lens, the negative lens and the reduction side positive lens are referred to as a first lens, a second lens and a third lens, respectively, the following conditions are satisfied:

$$5 < v2-v1 < 80$$

$$5 < v2-v3 < 80$$

$$0.03 < N1-N2 < 1.0$$

$$0.03 < N3-N2 < 1.0$$

where v1 represents an Abbe number of a material of the first lens, v2 represents an Abbe number of a material of the second lens, v3 represents an Abbe number of a material of the third lens, N1 represents a refractive index of the material of the first lens, N2 represents a refractive index of the material of the second lens, and N3 represents a refractive index of the material of the third lens.

The present invention provides another aspect thereof an image projection optical system including a light modulation element, and the above imaging optical system used as a projection optical system to project a light modulated by the light modulation element.

The present invention provides further another aspect thereof an image projection apparatus including the above image projection optical system, and a driver to drive the light modulation element on a basis of an input image signal.

Other aspects and features of the present invention will be described in the following embodiments.

DESCRIPTION OF THE EMBODIMENTS

Exemplary embodiments of the present invention will be described below with reference to the attached drawings.

Figure 7:
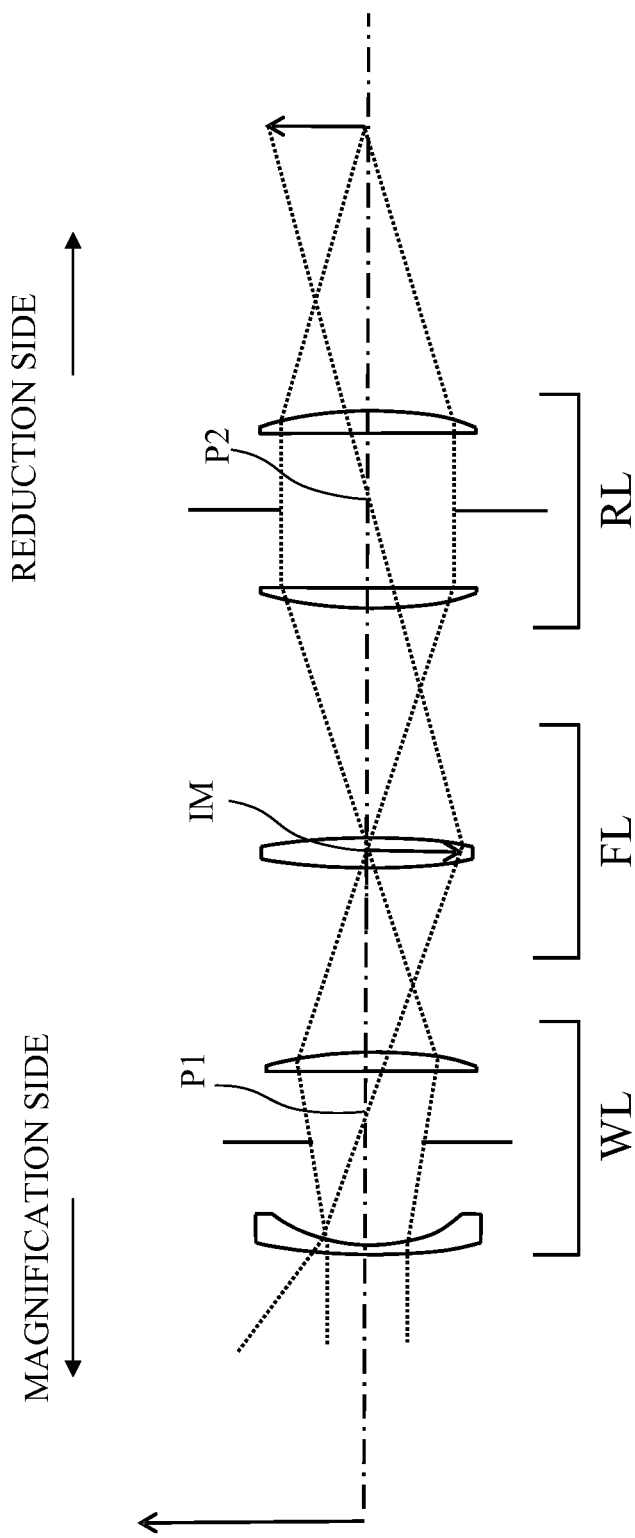
FIG. 7 illustrates each unit of an imaging optical system which forms an intermediate image.

FIG. 7 illustrates an imaging optical system as a typical embodiment of the present invention. First of all, referring to FIG. 7, description will be made of matters common to specific embodiments described later. As illustrated in FIG. 7, the imaging optical system of the embodiment is constituted by, in order from a magnification conjugate side (indicated as "MAGNIFICATION SIDE" in the drawing) to a reduction (demagnification) conjugate side (indicated as "REDUCTION SIDE" in the drawing), a wide-angle lens portion WL, a field lens portion FL and a relay lens portion RL, each lens portion including multiple lenses. The magnification conjugate side means a side on which a magnification side conjugate surface is located, and the reduction conjugate side means a side on which a reduction side conjugate surface is located.

The field lens portion FL has thereinside an intermediate imaging surface (IM in the drawing denotes an intermediate imaging position where the intermediate imaging surface is located). The field lens portion FL provides a conjugate relation between an exit pupil of the wide-angle lens portion WL and an entrance pupil of the relay lens portion RL. The relay lens portion RL relays an intermediate image formed by intermediate imaging inside the field lens portion FL to a final image surface. An image of an object placed at the magnification conjugate side is inverted and formed inside the imaging optical system and then re-inverted on the final image surface, thereby being formed as an erected image.

Description of a case where a light enters the imaging optical system will be made. The field lens portion FL is formed by a series of lenses disposed between a position at which an axial light flux in the wide-angle lens portion WL starts to converge after being in an approximately afocal state and a position at which the axial light flux in the relay lens portion RL comes into the approximately afocal state. The lenses constituting the field lens portion FL form virtual images as other intermediate images on both of the magnification conjugate side and the reduction conjugate side further than the intermediate imaging position (intermediate imaging surface). Although the case where the light enters the imaging optical system from the magnification conjugate side was described, the light may enter the imaging optical system from the reduction conjugate side.

Imaging optical systems each forming an intermediate image can have a configuration in which the above-mentioned three lens portions WL, FL and RL share roles such that each lens portion compensates for disadvantages of the other lens portions. In particular, this configuration allows the wide-angle lens portion WL not to perform only by itself a strict correction of off-axis aberration generated due to its wide angle of view, which makes it possible to significantly miniaturize the wide-angle lens portion WL.

However, in the imaging optical system of the embodiment, since each of the three lens portions WL, FL and RL has a positive refractive power, axial chromatic aberrations are combined in front of and behind the intermediate imaging position IM. Moreover, since the imaging optical system corrects a high-order off-axis aberration generated due to increase in angle of view at a position where a ray height is low, the high-order aberration is insufficiently corrected, which causes field curvature and distortion to noticeably remain at a middle image height.

The field lens portion FL is disposed between two points P1 and P2 at both of which an off-axis principal ray of an entering light flux intersects with an optical axis of the imaging optical system. The field lens portion FL includes, though being illustrated in drawings in subsequent specific embodiments, a magnification side positive lens (first lens) L1 disposed on the magnification conjugate side further than the intermediate imaging position IM and being convex toward the magnification conjugate side, a reduction side positive lens (third lens) L3 disposed on the reduction conjugate side further than the intermediate imaging position IM and being convex toward the reduction conjugate side, and a negative lens (second lens) L2 disposed between the positive lenses L1 and L3. The field lens unit FL satisfying predetermined conditions described later facilitates correction of the above-mentioned aberrations.

Inside the field lens portion FL, the axial light flux is converted into a convergent light flux converging from the magnification conjugate side toward the intermediate imaging position IM, forms the intermediate image and then becomes a divergent light flux. In this field lens portion FL, forming the positive lens L1 in a convex shape toward the magnification conjugate side enables reducing an influence of the positive lens L1 on the axial light flux, thereby intensively refracting the off-axis light flux in a direction toward the optical axis of the imaging optical system. In addition, disposing, at the reduction conjugate side further than the intermediate imaging position IM, the convex positive lens L3 formed in a convex shape toward the reduction conjugate side enables reducing the influence on the axial light flux, thereby intensively refracting the off-axis light flux in a convergence direction, similarly to the positive lens L1.

The positive lenses L1 and L3 provide, by their arrangement across the intermediate imaging position IM, refractions each having a function of correcting the off-axis aberration. That is, the refractions correct a low-order off-axis aberration and generate a high-order off-axis aberration, which in particular makes it possible to correct a high-order off-axis aberration generated in the wide-angle lens portion WL. Using a material having a high refractive index as a material of the positive lenses L1 and L3 enables reducing a length of the field lens portion FL in the optical axis direction.

In addition, disposing the negative lens L2 between the positive lenses L1 and L3 so as to diverge the off-axis light flux enables increasing refraction of the off-axis light flux, which provides a higher effect to correct the off-axis aberration. In general, a retrofocus optical system is used as the wide-angle lens portion WL. In such a case, field curvature and distortion are likely to remain at a minus side. Thus, it is necessary that the field lens portion FL and the relay lens portion RL generate aberration in a direction in which the field curvature and the distortion are corrected. For this reason, it is desirable to provide to the negative lens L2 a lower refractive index compared to those of the positive lenses L1 and L3 to cause the negative lens L2 to generate a high-order off-axis aberration.

On the other hand, as a method of correcting the axial chromatic aberration, a method is proposed which uses, with an achromatic lens having a strong achromatic effect, a high dispersion material for a positive lens to correct a two-dimensional axial chromatic aberration. However, in this method, using a strong refractive surface for the axial light flux makes the achromatic effect insufficient or excessively increases the number of lenses, which is undesirable. In the imaging optical system forming the intermediate image, it is desirable to use the high dispersion material for the positive lenses L1 and L3 of the field lens portion FL. In particular, using the high dispersion material for the positive lens L1 enables the positive lenses L1 and L3 to also provide refractions each having a function of correcting a second-order chromatic aberration of magnification which is likely to be generated in the wide-angle lens portion WL. In this case, it is necessary to set Abbe numbers $v1$, $v2$ and $v3$ of the materials of the positive lens L1, the negative lens L2 and the positive lens L3 within the following ranges:

$$5<\nu2-\nu1<80 \tag{1}$$

$$5<\nu2-\nu3<80 \tag{2}$$

A lower value of ν2−ν1 than the lower limit of expression (1) decreases the dispersion of the material of the positive lens L1 or increases the dispersion of the material of the negative lens L2, which decreases an amount of correction of the second-order axial chromatic aberration or increases an amount of generation of the chromatic aberration of magnification. On the other hand, a higher value of ν2−ν1 than the upper limit of expression (1) undesirably makes it impossible to find a glass whose chemical, thermal and mechanical properties can be ensured in a visible light region. A lower value of ν2−ν3 than the lower limit of expression (2) undesirably makes a correction function for a chromatic aberration of magnification generated in the positive lens L1 insufficient. On the other hand, a higher value of ν2−ν3 than the upper limit of expression (2) undesirably makes it impossible to find a glass whose chemical, thermal and mechanical properties can be ensured in the visible light region.

It is desirable to set the refractive indices N1, N2 and N3 of the materials of the positive lens L1, the negative lens L2 and the positive lens L3 within the following ranges:

$$0.03<N1-N2<1.0 \tag{3}$$

$$0.03<N3-N2<1.0 \tag{4}$$

A lower value of N1−N2 than the lower limit of expression (3) undesirably increases an amount of generation of a high-order off-axis aberration in the positive lens L1 or decreases an amount of correction of a high-order off-axis aberration to be corrected by the negative lens L2. A lower value of N3−N2 than the lower limit of expression (4) undesirably makes it difficult to select a glass capable of sufficiently correcting the high-order off-axis aberration to be corrected by the negative lens L2. A higher value of N1−N2 than the upper limit of expressions (3) and a higher value of N3-N2 than the upper limit of expression (4) each make it impossible to find a glass whose transmittance property, processability and the like are stable in the visible light region.

As described above, it is desirable to constitute the field lens portion FL by the positive lens L1, the negative lens L2 and the positive lens L3, to use as the material of the positive lenses L1 and L3 a high refractive index and high dispersion glass and to use as the material of the negative lens L2 a low refractive index and low dispersion glass.

Furthermore, in the wide-angle lens portion WL, disposing a lens having a convex shape toward a direction opposite to the positive lens L1 (that is, toward the reduction conjugate side) and using a low dispersion material for that lens enables suppressing generation of the axial chromatic aberration. Similarly, in the relay lens portion RL, disposing a lens having a convex shape toward a direction opposite to the positive lens L3 (that in, toward the magnification conjugate side) and using a low dispersion material for that lens enables suppressing generation of the axial chromatic aberration. For these reasons, in the embodiment, the wide-angle lens portion WL includes a positive lens L4 (fourth lens) disposed on the magnification conjugate side further than the positive lens L1 and being convex toward the reduction conjugate side, and the relay lens portion RL includes a positive lens L5 (fifth lens) disposed on the reduction conjugate side further than the positive lens L3 and being convex toward the magnification conjugate side. It is desirable that Abbe numbers ν4 and ν5 indicating dispersions of the positive lenses L4 and L5 and the Abbe numbers ν1 and ν3 indicating the dispersions of the positive lenses L1 and L3 satisfy the following conditions:

$$10<\nu5-\nu3\leq76.15 \tag{5}$$

$$10<\nu4-\nu1<60 \tag{6}$$

In order to increase a converging power with a small number of lenses, it is desirable to provide to the positive lens L4 a convex shape toward the reduction conjugate side and to provide to the positive lens L5 a convex shape toward the magnification conjugate side. Satisfying expressions (5) and (6) enables suppressing generation of the axial chromatic aberration. A lower value of ν5−ν3 than the lower limit of expression (5) and a lower value of ν4−ν1 than the lower limit of expression (6) each excessively increase the amount of generation of the axial chromatic aberration, which is undesirable. Similarly, a higher value of ν5−ν3 than the upper limit of expression (5) and a higher value of ν4−ν1 than the upper limit of expression (6) each undesirably make it impossible to find a glass whose chemical, thermal and mechanical properties can be ensured in the visible light region.

It is also desirable that, when SP1 represents a shape factor of the positive lens L1 and SP3 represents a shape factor of the positive lens L3, SP1 and SP3 satisfy following expressions (7) and (8):

$$-10<SP1<0 \tag{7}$$

$$0<SP3<+10 \tag{8}$$

The shape factor SP is defined by the following expression: SP=(R1+R2)/(R1−R2) where R1 represents a curvature radius of a magnification conjugate side lens surface and R2 represents a curvature radius of a reduction conjugate side lens surface.

A lower shape factor SP1 than the lower limit of expression (7) provides an excessively strong meniscus shape to the positive lens L1 and thereby makes it impossible to sufficiently correct the second-order axial chromatic aberration, which is undesirable. A higher shape factor SP1 than the upper limit of expression (7) excessively increases an amount of generation of a first-order axial chromatic aberration generated in the positive lens L1 and thereby unnecessarily makes a large number of achromatic lenses, which is undesirable. A lower shape factor SP3 than the lower limit of expression (8) excessively increases an amount of generation of a first-order axial chromatic aberration generated in the positive lens L3, which is undesirable. A higher factor SP3 than the upper limit of expression (8) undesirably makes it impossible to sufficiently correct the second-order axial chromatic aberration.

Moreover, it is desirable to set a partial dispersion ratio θgf1 of the positive lens L1 within the following range:

$$0.600<\theta gf1<0.800 \tag{9}$$

The partial dispersion ratio θgf1 is defined by the following expression where Ng, Nf and NC respectively represent refractive indices of the material of the positive lens L1 for a g-line, an f-line and a C-line.

$$\theta gf1=(Ng-Nf)/(Nf-NC)$$

Increasing the dispersion of the positive lens L1 enables correcting both the second-order chromatic aberration of magnification and the second-order axial chromatic aberration. A lower partial dispersion ratio θgf1 than the lower limit of expression (9) undesirably deteriorates an effect of the above-mentioned correction. A higher partial dispersion ratio θgf1 than the upper limit of expression (9) undesirably makes it impossible to find a glass whose chemical, thermal and mechanical properties can be ensured in the visible light region.

It is more desirable to set an anomalous dispersion Δθgf1 of the positive lens L1 within the following range:

$$0.010 < \Delta\theta gf1 < 0.050 \qquad (10)$$

where the anomalous dispersion Δθgf1 is defined by Δθgf1=θgf1−(0.6438−0.001682×ν1).

Setting the anomalous dispersion Δθgf1 within the range of expression (10) enables more efficiently correcting the second-order chromatic aberration of magnification and the second-order axial chromatic aberration. A lower anomalous dispersion Δθgf1 than the lower limit of expression (10) undesirably deteriorates an effect of the above-mentioned correction. A higher anomalous dispersion Δθgf1 than the upper limit of expression (10) undesirably makes it impossible to find a glass whose chemical, thermal and mechanical properties can be ensured in the visible light region.

Furthermore, it is desirable to satisfy the following conditions where fWL, fFL and fRL respectively represent focal lengths of the wide-angle lens portion WL, the field lens portion FL and the relay lens portion RL.

$$0.0 < fWL/fFL < 2.0 \qquad (11)$$

$$0.0 < fWL/fRL < 2.0 \qquad (12)$$

A lower value of fWL/fFL than the lower limit of expression (11) and a lower value of fWL/fRL than the lower limit of expression (12) each deteriorate a relation in sharing the aberration correction between the wide-angle lens portion WL, the field lens portion FL and the relay lens portion RL. This deterioration makes aberration correction in each lens portion necessary, which undesirably increases the number of lenses. On the other hand, a higher value of fWL/fFL than the upper limit of expression (11) and a higher value of fWL/fRL than the upper limit of expression (12) each make it difficult to provide a sufficient angle of view or each increase an effective diameter of an intermediate part of the imaging optical system or the entire length of the imaging optical system, which is undesirable.

In addition, it is desirable to satisfy the following conditions where f1, f2 and f3 respectively represent focal lengths of the positive lens L1, the negative lens L2 and the positive lens L3.

$$0.5 < f1/f3 < 3.0 \qquad (13)$$

$$-2.0 < f2/f3 < -0.5 \qquad (14)$$

A higher value of f1/f3 than the upper limit of expression (13) or a lower value of f1/f3 than the lower limit thereof deteriorates the aberration correction function provided by the positive lenses L1 and L3 or increases the number of lenses, which is undesirable. A lower value of f2/f3 than the lower limit of expression (14) excessively decreases the amount of correction of the off-axis aberration by the negative lens L2, which undesirable makes the correction of the off-axis aberration insufficient.

A higher value of f2/f3 than the upper limit of expression (14) excessively increases the amount of correction of the off-axis aberration by the negative lens L2 and thereby increases field curvature and distortion, which undesirably increases the number of lenses.

Furthermore, it is desirable to set a relation between the dispersions of the materials of the positive lenses L1 and L3 within the following range:

$$0 < \nu3 - \nu1 < 20 \qquad (15)$$

In contrast to the positive lens L1 which can correct the second-order axial chromatic aberration, the positive lens L3 mainly has a role of cancelling the first-order aberration generated in the positive lens L1, so that it is desirable to set the dispersion of the material of the positive lens L3 to a slightly lower dispersion than that of the positive lens L1. A lower value of ν3−ν1 than the lower limit of expression (15) decreases the amount of correction of the second-order axial chromatic aberration. A higher value of ν3−ν1 than the upper limit of expression (15) undesirably deteriorates a function of canceling the first-order aberration.

Other lens configurations are as follows. In order to correct the high-order off-axis aberration and the second-order axial chromatic aberration, a high dispersion glass is used for each of the positive lenses L1 and L3 of the field lens portion FL, so that each of the wide-angle lens portion WL and the relay lens portion RL includes multiple achromatic lenses having a strong achromatic effect.

It is enough that the imaging optical system includes at least one lens corresponding to each of the positive lens L1, the negative lens L2 and the positive lens L3. Moreover, a lens having a weak refractive power, a parallel plate or the like may be included in spaces between the lenses L1 and L5.

The specific embodiments of the present invention will be described below.

Embodiment 1

Figure 1:
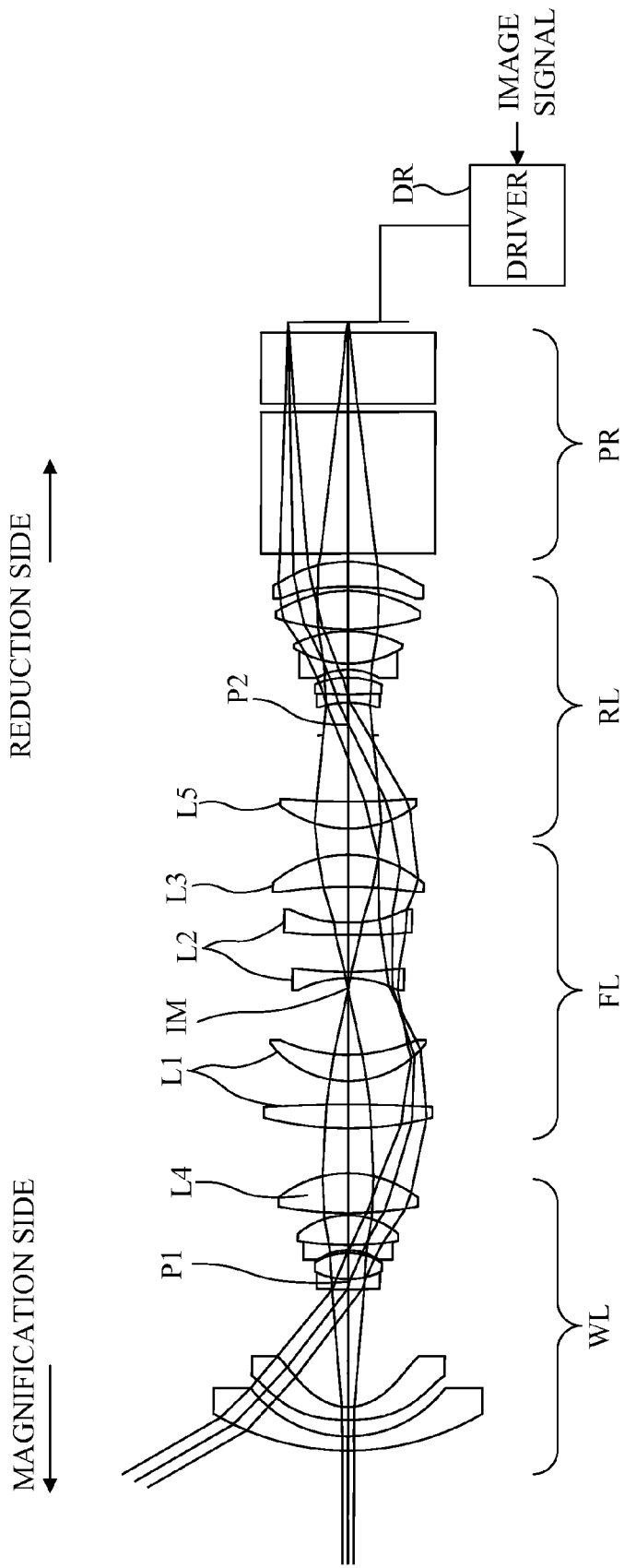
FIG. 1 is a sectional view of an imaging optical system that is Embodiment 1 of the present invention.

FIG. 1 and Table 1 illustrate a configuration of an image projection optical system including an imaging optical system that is Embodiment 1 (Numerical Example). This optical system is used in an image projection apparatus which projects light modulated by a light modulation element such as a liquid crystal panel and a digital micro mirror device onto a projection surface; the light modulation element is disposed at a position of a vertical line illustrated at a most reduction conjugate side position in the drawing. Although FIG. 1 illustrates one light modulation element, multiple light modulation elements are provided in an actual image projection apparatus.

The image projection apparatus includes a driver DR which drives the light modulation element on a basis of an image signal input to the apparatus. The imaging optical system is used as a projection optical system which projects the light (entering light flux) modulated by the light modulation element disposed at the reduction conjugate side, onto the projection surface such as a screen disposed at the magnification conjugate side. In the imaging optical system, on the reduction conjugate side further than the relay lens portion RL, a prism RP is disposed which combines multiple color lights respectively modulated by the multiple light modulation elements and introduces the combined lights to the imaging optical system (projection optical system). The above-described configuration is common to those of Embodiments 2 and 3 described later.

The imaging optical system of this embodiment has the following lens configuration. The wide-angle lens portion WL is constituted by seven lenses including the positive lens L4 which is disposed at a most reduction conjugate side position (closest to the field lens portion FL) in the wide-angle lens portion WL. The field lens portion FL is constituted by five lenses including, in order from the magnification conjugate side to the reduction conjugate side, the positive lens L1, the negative lens L2 and the positive lens L3. Each of the positive lens L1 and the negative lens L2 is constituted by two lenses, and the positive lens L3 is constituted by a single lens. The relay lens portion RL is constituted by seven lenses including the positive lens L5 which is disposed at a most magnification conjugate side position (closest to the field lens portion FL) in the relay lens portion RL. The intermediate imaging position IM is located between the positive lens L1 and the negative lens L2.

The positive lens L1 is divided into the two lenses for correction of aberration of an off-axis light flux. The two lenses are each formed of a high refractive index and high dispersion material.

The negative lens L2 is also divided into the two lenses. The two lenses are each formed of a low refractive index and low dispersion material. Since the negative lens L2 is located close to the intermediate imaging point IM, a ray height of an axial light flux passing through the negative lens L2 is lower than those in the other lenses. Thus, the negative lens L2 has a smaller influence on the axial light flux. On the other hand, the negative lens L2 is set so as to provide a large deviation angle to the off-axis light flux, so that the negative lens L2 generates a high-order off-axis aberration. In this embodiment, the negative lens L2 is divided into the two lenses and one of them which is disposed on the reduction conjugated side is provided with an aspheric shape, which enables correcting spherical aberration and coma aberration.

The positive lens L3 is formed of a high refractive index and high dispersion material, which enables the positive lens L3 to cancel a relatively-low-order off-axis aberration generated in the positive lens L1 and provides to the entire field lens portion FL a configuration dedicated to correction of the high-order off-axis aberration.

Moreover, the field lens portion FL includes the lenses disposed in front of and behind the intermediate imaging position IM so as to have the aberration correction function. However, the field lens portion FL only having such a configuration makes it difficult to suppress aberration generated by the wide-angle lens portion WL having a large angle of view. Therefore, the wide-angle lens portion WL is provided with an aspheric lens to reduce the aberration generated therein, and the relay lens portion RL is provided with an aspheric lens to correct the off-axis aberration. This configuration of the wide-angle and relay lens portions WL and RL combined with the configuration of the field lens unit FL makes it possible to provide an extremely high aberration correction effect.

On the other hand, it is necessary to use a high dispersion material for each of the positive lenses L1 and L3 and to correct the first-order axial chromatic aberration. Thus, in this embodiment, the wide-angle lens portion WL is provided with a cemented lens including a cemented lens surface whose surface number (Surf) in Table 1 is 6 and an achromatic cemented lens including a cemented lens surface whose surface number is 9. Moreover, the relay lens portion RL is provided with a cemented lens including a cemented lens surface whose surface number is 27 and an achromatic cemented lens including a cemented lens surface whose surface number is 30.

In Table 1 (and Table 2 and 3 respectively illustrating Numerical Examples 2 and 3), each surface number i indicated by symbol Surf is an ordinal number of each lens surface in order from the magnification conjugate side to the reduction conjugate side, and symbol Φea represents a ray effective diameter of each lens. Symbol R denotes a curvature radius of an i-th lens surface, and D a distance between the i-th lens surface and an (i+1)-th lens surface. Symbol glass represents a glass material of each lens. Symbol $N_d$ and $v_d$ respectively represent a refractive index and an Abbe number of the glass material for a d-line (587.56 nm).

Each lens surface whose surface number followed by an asterisk (*) has an aspheric shape represented by the following function. Each Table shows aspherical coefficients in the function. Symbol e±M denotes $\times 10^{\pm M}$. Symbols y and x respectively denote a coordinate in a diameter direction and a coordinate in the optical axis direction, each being defined with a surface apex of the lens surface being a reference point.

$$x=(y^2/R)/\{1+[1-(1+K(y^2/R^2)]^{1/2}\}+Ay^4+By^6+Cy^8+Dy^{10}+Ey^{12}+Fy^{14}+Gy^{16}$$

Symbol Fno represents an F number, Φ an effective image circle diameter, and ω a half angle of view.

In Table 1, a focal length of the entire imaging optical system is represented by an absolute value |f|. The reason for this is that the imaging optical system forming conjugate points thereinside forms an erect image on the final image surface and thereby the focal length of the entire imaging optical system may be a negative value depending on its definition. However, since a combined refractive power of the entire imaging optical system has a positive value, the focal length thereof is indicated by the absolute value. This notation is common to Tables 2 and 3.

Table 4 collectively shows the focal lengths of the entire imaging optical system and of each lens portion and values of expressions (1) to (15) in Numerical Example 1.

Figure 2:
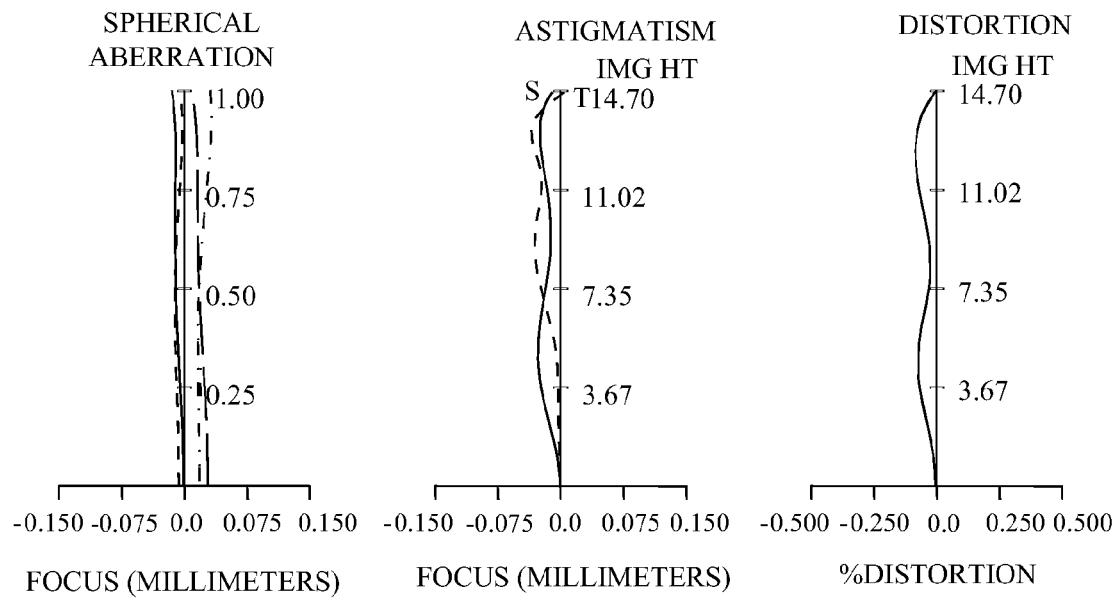
FIG. 2 is aberration diagrams of the imaging optical system of Embodiment 1.
Figure 2:
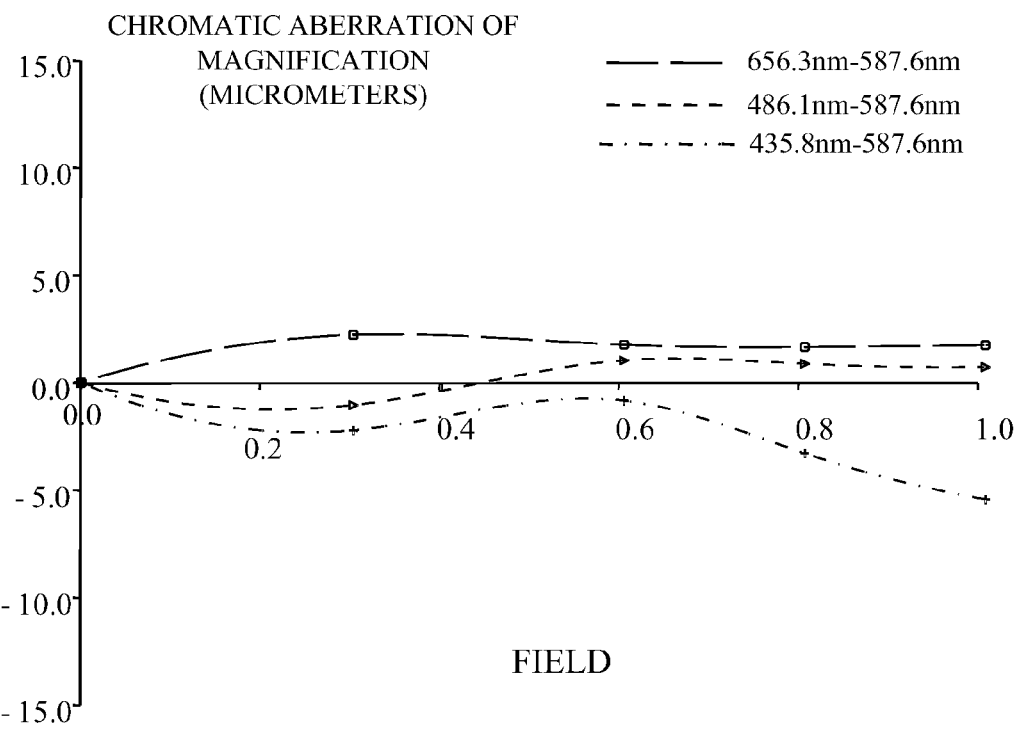

FIG. 2 shows aberration diagrams representing an imaging performance of the imaging optical system of Numerical Example 1. FIG. 2 illustrates, in order from the left side, a spherical aberration diagram, an astigmatism diagram and a distortion diagram. In the spherical aberration diagram, a solid line indicates a spherical aberration for the d-line (587.56 nm), a dashed line indicates a spherical aberration for an F-line (486.13 nm), and a dotted line indicates a spherical aberration for a C-line (656.27 nm). A horizontal scale indicates a defocus amount in a range from −0.15 to +0.15 [mm]. In the astigmatism diagram, a solid line indicates astigmatism on a sagittal image surface, and a dotted line indicates field curvature on a meridional image surface. A horizontal scale indicates a defocus amount similarly to the spherical aberration diagram. In the distortion diagram, a horizontal scale indicates a distortion in a range from −0.5 to +0.5[%]. The above-described notation is common to aberration diagrams in Numerical Examples 2 and 3.

As illustrated in FIG. 2, the imaging optical system of this embodiment (Numerical Example 1) sufficiently corrects both the off-axis aberration varying depending on image height and the axial chromatic aberration.

Embodiment 2

Figure 3:
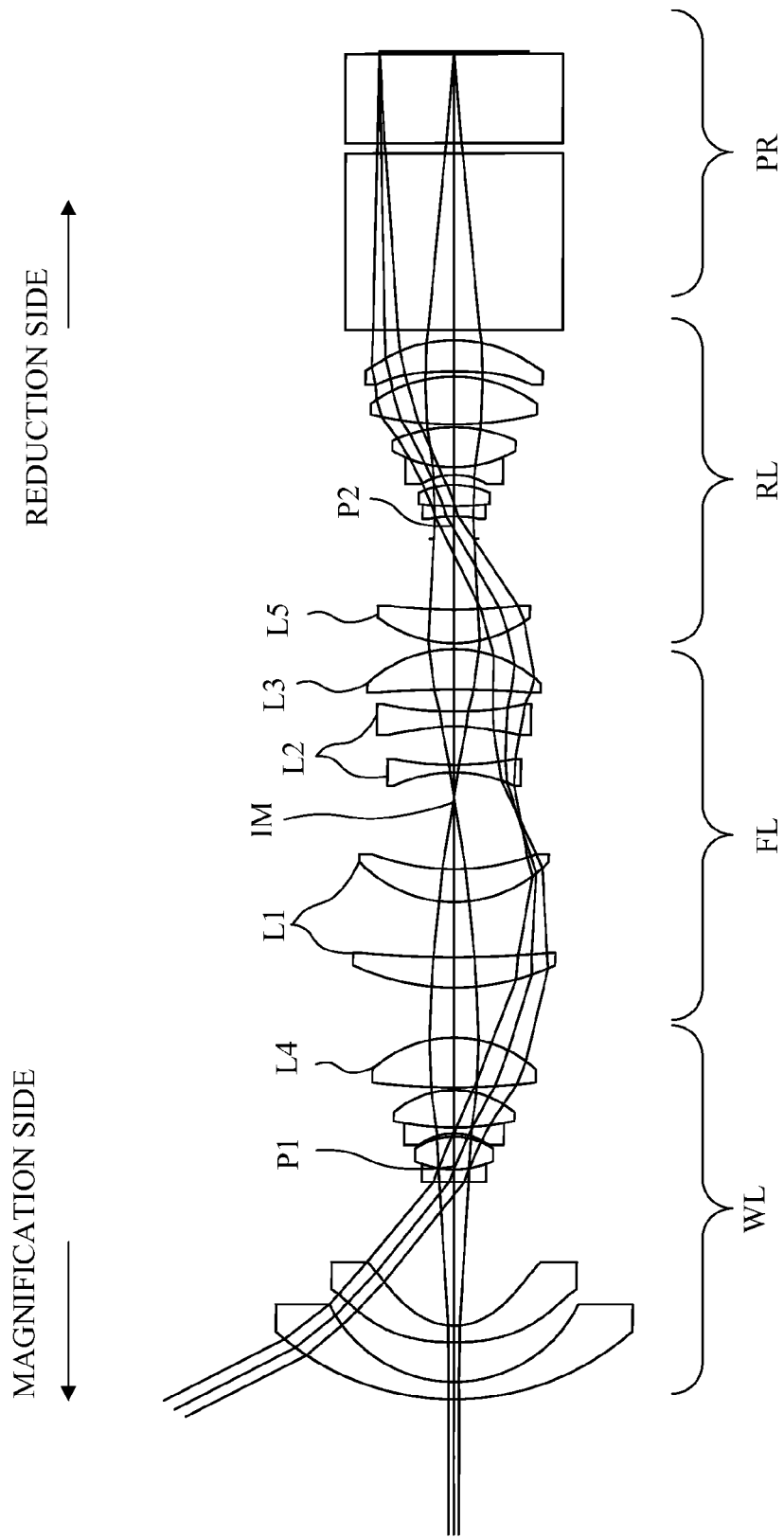
FIG. 3 is a sectional view of an imaging optical system that is Embodiment 2 of the present invention.

FIG. 3 and Table 2 illustrate a configuration of an image projection optical system including an imaging optical system that is Embodiment 2 (Numerical Example 2). The imaging optical system of this embodiment has a slightly shorter focal length compared to that in Embodiment 1 and uses a different type of glass material.

The imaging optical system of this embodiment has the following lens configuration similarly to that of Embodiment 1. That is, the wide-angle lens portion WL is constituted by seven lenses which include the positive lens L4 which is disposed at a most reduction conjugate side position (closest to the field lens unit FL) in the wide-angle lens portion WL. The field lens portion FL is constituted by five lenses including, in order from the magnification conjugate side to the reduction conjugate side, the positive lens L1, the negative lens L2 and the positive lens L3. Each of the positive lens L1 and the negative lens L2 is constituted by two lenses, and the positive lens L3 is constituted by a single lens. The relay lens portion RL is constituted by seven lenses including the positive lens L5 which is disposed at a most magnification conjugate side position (closest to the field lens portion FL) in the relay lens portion RL. The intermediate imaging position IM is located between the positive lens L1 and the negative lens L2.

Table 4 collectively shows the focal lengths of the entire imaging optical system and of each lens portion and values of expressions (1) to (15) in Numerical Example 2.

Figure 4:
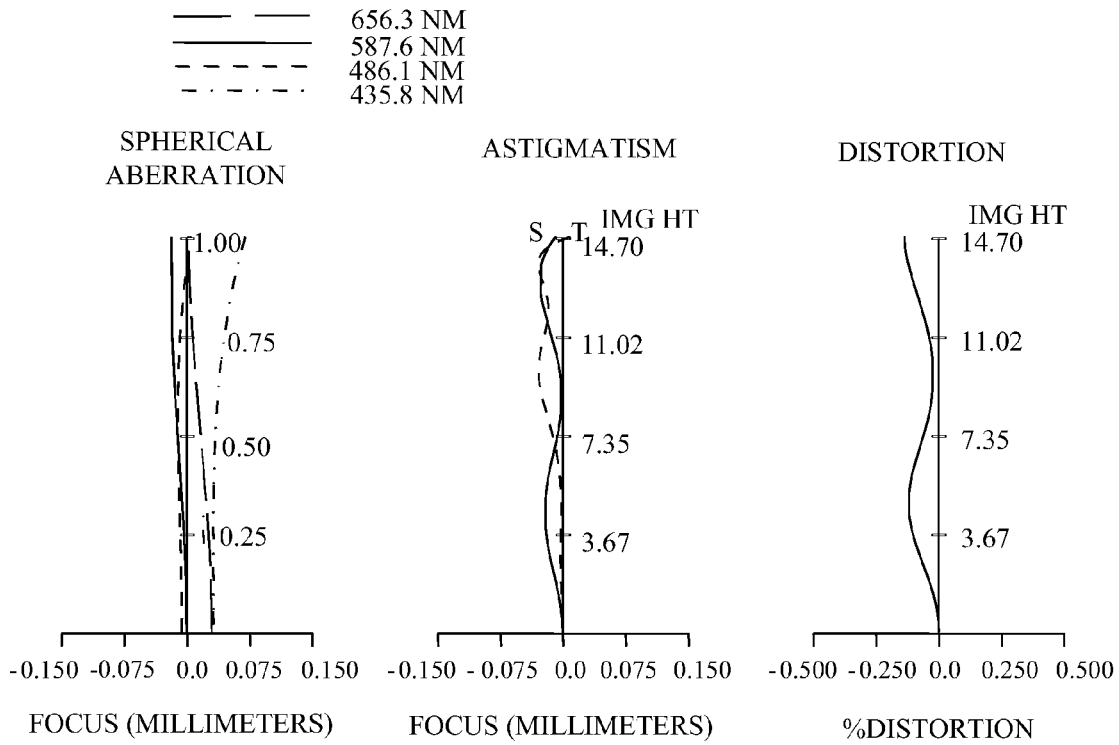
FIG. 4 is aberration diagrams of the imaging optical system of Embodiment 2.
Figure 4:
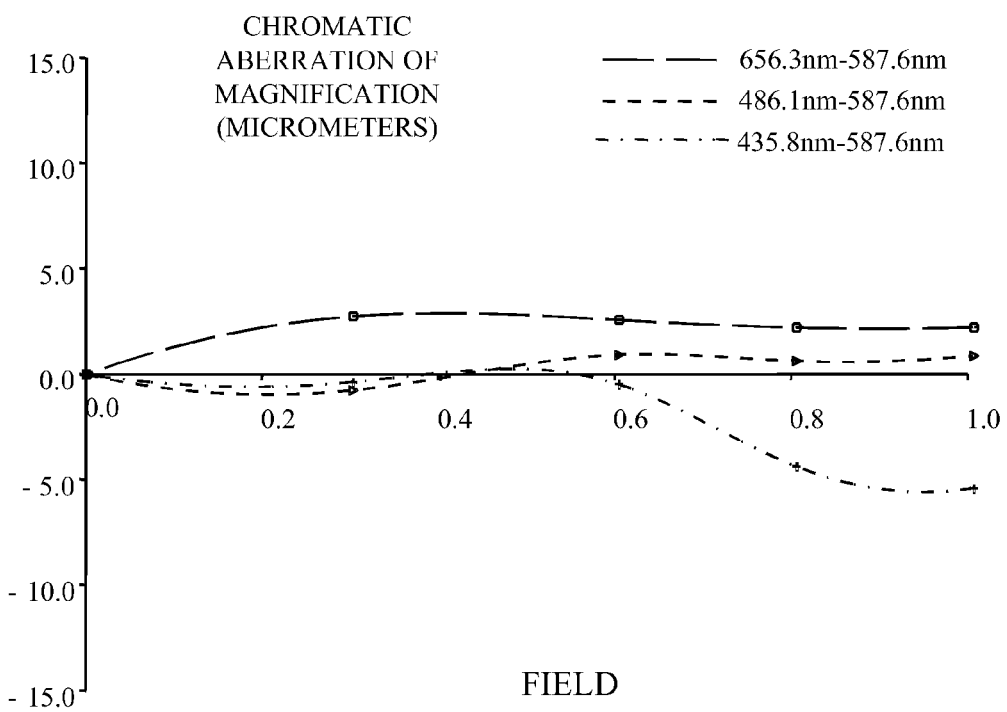

FIG. 4 shows aberration diagrams representing an imaging performance of the imaging optical system of Numerical Example 2. As illustrated in FIG. 4, the imaging optical system of this embodiment (Numerical Example 2) in which the glass material is different from that in Embodiment 1 can provide a sufficient aberration correction effect as long as the glass material satisfies the above conditions (1) to (15).

Embodiment 3

Figure 5:
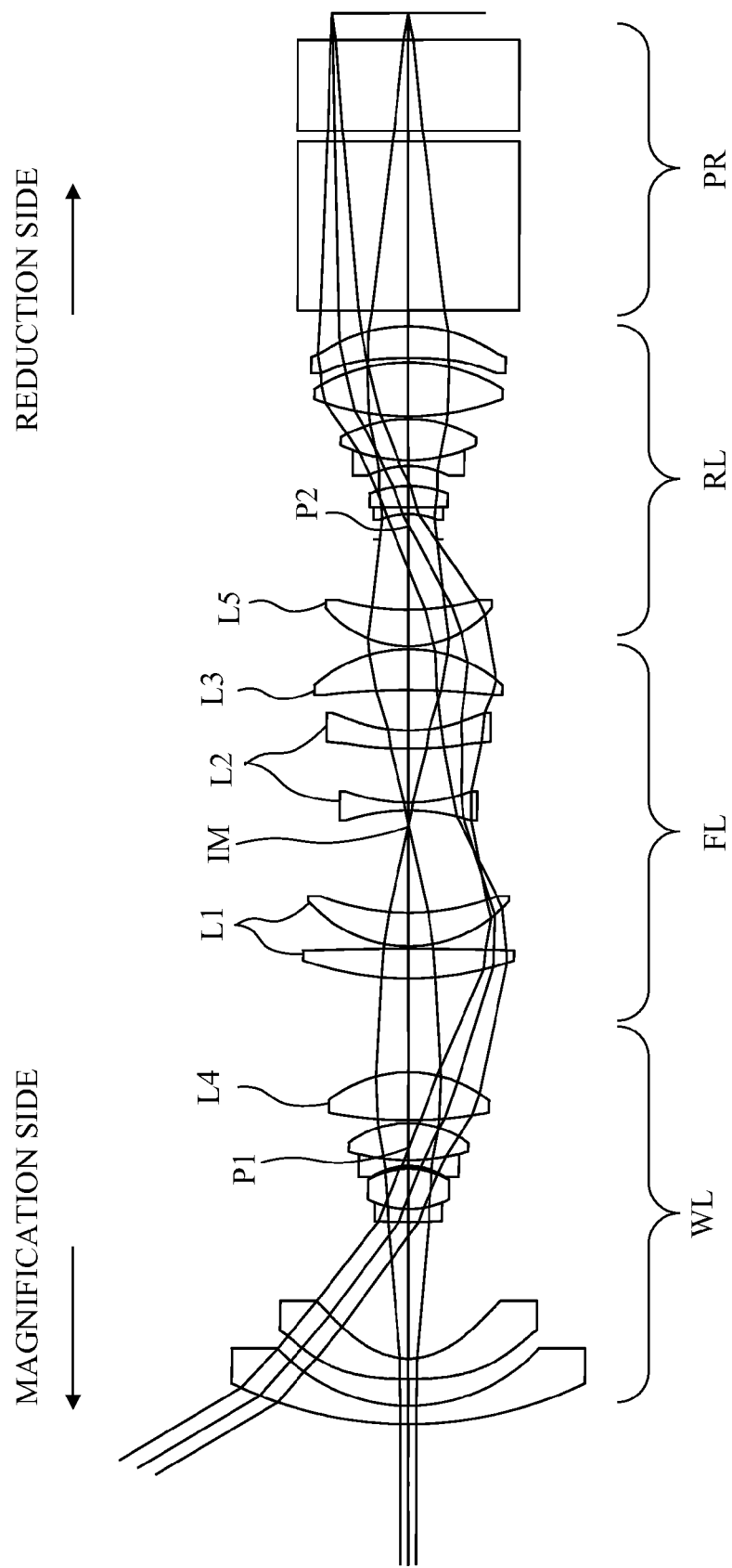
FIG. 5 is a sectional view of an imaging optical system that is Embodiment 3 of the present invention.

FIG. 5 and Table 3 illustrate a configuration of an image projection optical system including an imaging optical system that is Embodiment 3 (Numerical Example 3). The imaging optical system of this embodiment includes achromatic cemented lenses each having a slightly weaker achromatic effect compared to that in Embodiment 1.

The imaging optical system of this embodiment has the following lens configuration similarly to that of Embodiment 1. That is, the wide-angle lens portion WL is constituted by seven lenses including the positive lens L4 which is disposed at a most reduction conjugate side position (closest to the field lens portion FL) in the wide-angle lens portion WL. The field lens unit FL is constituted by five lenses including, in order from the magnification conjugate side to the reduction conjugate side, the positive lens L1, the negative lens L2 and the positive lens L3. Each of the positive lens L1 and the negative lens L2 is constituted by two lenses, and the positive lens L3 is constituted by a single lens. The relay lens portion RL is constituted by seven lenses including the positive lens L5 which is disposed at a most magnification conjugate side position (closest to the field lens portion FL). The intermediate imaging position IM is located between the positive lens L1 and the negative lens L2.

Figure 6:
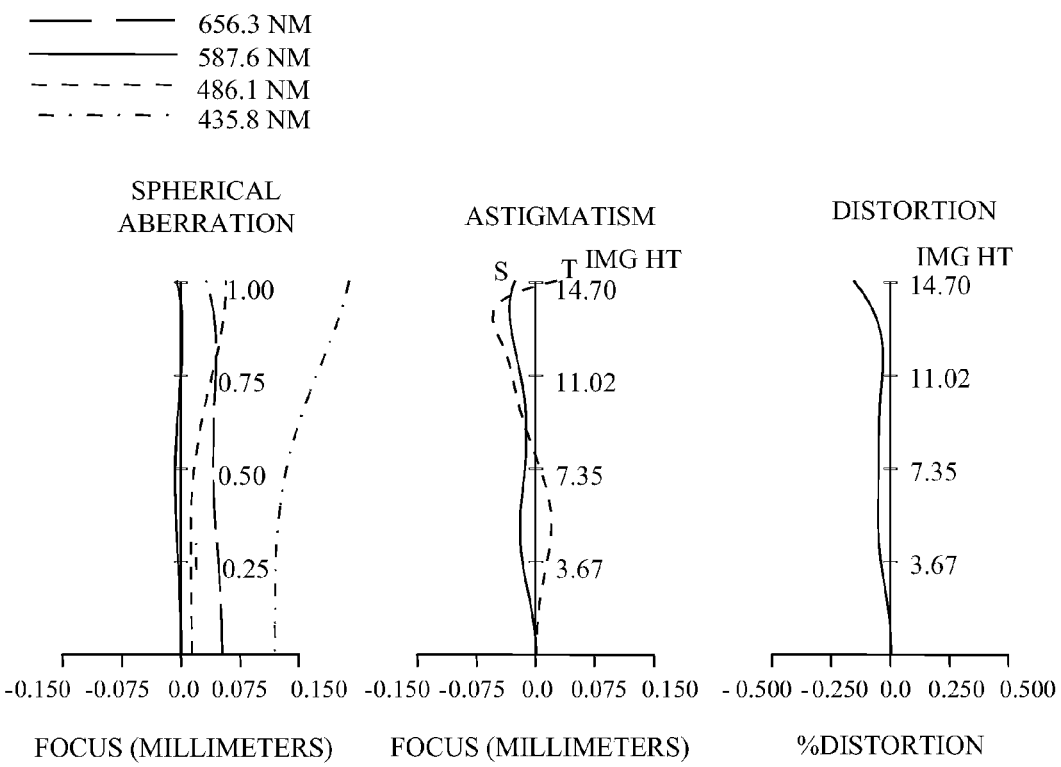
FIG. 6 is aberration diagrams of the imaging optical system of Embodiment 3.
Figure 6:
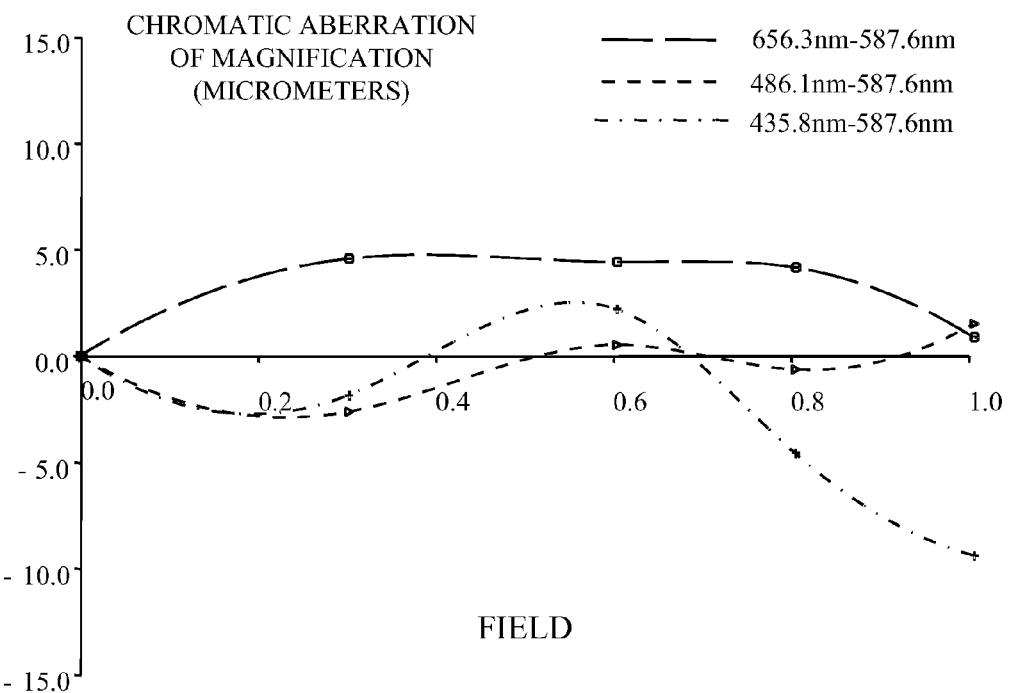

Table 4 collectively shows the focal lengths of the entire imaging optical system and of each lens portion and values of expressions (1) to (15) in Numerical Example 3. FIG. 6 shows aberration diagrams representing an imaging performance of the imaging optical system of Numerical Example 3.

An three-panel image projection apparatus including three light modulation elements corresponding to three color lights to be modulated allows fine adjustment of positions of the light modulation elements independently and thereby can use the imaging optical system whose aberrations are corrected to the levels shown in FIG. 6. The imaging optical system of this embodiment can control its axial chromatic aberration and thus is effective especially in a case where the positions of the three light modulation elements are intentionally displaced with respect to each other.

The imaging optical system forming the intermediate image which was described in each of the above embodiments can sufficiently correct the high-order off-axis aberration and the axial chromatic aberration to form a high definition image. Moreover, the image projection apparatus using the imaging optical system can project a high definition and large sized image at a short projection distance.

TABLE 1

(Numerical Example 1)
|f| = 8.526 Fno = 2.8 Φ = 29.4 ω = 59.9

| Surf | Φea | R | D | glass | Nd | νd |
|---|---|---|---|---|---|---|
| OBJ | | | 840 | | | |
| 1 | 62.6 | 64.060 | 3.50 | STIH6 | 1.812 | 25.4 |
| 2 | 47.8 | 29.873 | 4.08 | | | |
| 3* | 44.6 | 50.099 | 3.20 | LBAL42 | 1.585 | 59.4 |
| 4* | 34.7 | 11.754 | 29.15 | | | |
| 5 | 14.0 | 171.502 | 2.50 | FDS90 | 1.854 | 23.8 |
| 6 | 14.0 | 18.717 | 6.50 | SFPM2 | 1.597 | 67.7 |
| 7 | 14.7 | −15.196 | 0.71 | | | |
| 8 | 14.8 | −12.580 | 1.20 | FDS90 | 1.854 | 23.8 |
| 9 | 20.0 | 71.081 | 7.40 | SFPM2 | 1.597 | 67.7 |
| 10 | 22.6 | −18.790 | 0.50 | | | |
| 11 | 29.4 | 88.475 | 9.90 | SFPL53 | 1.440 | 94.9 |
| 12 | 31.8 | −27.447 | 11.08 | | | |
| 13 | 38.7 | 79.526 | 6.00 | SNPH2 | 1.933 | 18.9 |
| 14 | 38.5 | −302.586 | 5.72 | | | |
| 15 | 35.6 | 24.245 | 6.50 | SNPH1 | 1.816 | 22.8 |
| 16 | 33.3 | 39.811 | 19.00 | | | |
| 17 | 24.4 | −26.429 | 1.50 | SBSL7 | 1.518 | 64.1 |
| 18 | 25.1 | 96.107 | 9.23 | | | |
| 19* | 28.3 | −165.929 | 3.00 | 531100.559 | 1.533 | 55.9 |
| 20* | 29.0 | 47.946 | 8.82 | | | |
| 21 | 32.6 | −114.334 | 8.00 | FDS90 | 1.854 | 23.8 |
| 22 | 34.5 | −27.741 | 6.44 | | | |
| 23 | 31.0 | 27.428 | 6.60 | SLAH66 | 1.776 | 49.6 |
| 24 | 29.3 | 149.004 | 16.41 | | | |
| 25 | 12.2 | 0.000 | 8.17 | | | |
| 26 | 14.0 | −22.711 | 2.00 | STIH6 | 1.812 | 25.4 |
| 27 | 14.0 | 148.918 | 4.20 | SBAL35 | 1.591 | 61.1 |
| 28 | 14.6 | −21.080 | 1.99 | | | |
| 29 | 15.5 | −14.972 | 1.50 | SNBH8 | 1.725 | 34.7 |
| 30 | 22.0 | 24.868 | 8.00 | SFPM2 | 1.597 | 67.7 |
| 31 | 24.4 | −28.885 | 0.50 | | | |
| 32 | 31.4 | 58.989 | 9.50 | SFPM2 | 1.597 | 67.7 |
| 33 | 32.8 | −33.059 | 1.00 | | | |
| 34* | 33.1 | −91.762 | 6.20 | LBAL42 | 1.585 | 59.4 |
| 35* | 34.3 | −32.811 | 2.00 | | | |
| 36 | 40.0 | 1.00E+13 | 35.00 | SBSL7 | 1.518 | 64.1 |
| 37 | 40.0 | 1.00E+13 | 2.00 | | | |
| 38 | 40.0 | 1.00E+13 | 17.70 | SF6 | 1.812 | 25.4 |
| 39 | 40.0 | 1.00E+13 | 2.61 | | | |
| IMG | | | | | | |

| No | 3 | 4 | 19 |
|---|---|---|---|
| R | 50.099 | 11.754 | −165.929 |
| K | 0 | −0.97988 | 0 |
| A | 3.5486E−05 | −8.0222E−06 | 4.7865E−05 |
| B | −6.0617E−08 | 2.8739E−07 | 4.2783E−08 |
| C | 1.3329E−10 | −1.2886E−09 | −1.2621E−09 |
| D | −2.2141E−13 | 4.1206E−12 | −4.5693E−12 |
| E | 1.7953E−16 | −2.3948E−14 | 9.3387E−14 |
| F | −2.2947E−20 | 6.5846E−17 | −3.9802E−16 |
| G | −1.6731E−22 | −6.0175E−20 | 5.8023E−19 |

| No | 20 | 34 | 35 |
|---|---|---|---|
| R | 47.946 | −91.762 | −32.811 |
| K | 0 | 0 | 0 |
| A | 7.2795E−05 | −2.1241E−05 | −8.9198E−06 |
| B | −3.6637E−07 | −2.9510E−08 | −1.4234E−08 |
| C | 1.4148E−09 | 1.4739E−10 | 1.8868E−11 |
| D | −1.2826E−11 | −3.6384E−13 | 5.6434E−13 |

TABLE 1-continued (Numerical Example 1)
|f| = 8.526 Fno = 2.8 Φ = 29.4 ω = 59.9

| | | | |
|---|---|---|---|
| E | 9.0306E−14 | 1.2335E−15 | −3.1217E−15 |
| F | −3.0403E−16 | 1.9887E−18 | 9.9719E−18 |
| G | 3.9255E−19 | −7.2994E−21 | −1.0670E−20 |

TABLE 2

(Numerical Example 2)
|f| = 7.500 Fno = 3.5 Φ = 29.4 ω = 63.0

| Surf | Φea | R | D | glass | Nd | vd |
|---|---|---|---|---|---|---|
| OBJ | | | 840 | | | |
| 1 | 66.9 | 57.577 | 3.50 | STIH6 | 1.812 | 25.42 |
| 2 | 49.7 | 28.706 | 6.13 | | | |
| 3* | 46.1 | 54.184 | 3.20 | LBAL42 | 1.585 | 59.38 |
| 4* | 34.9 | 11.297 | 28.20 | | | |
| 5 | 8.7 | 158.432 | 2.50 | FDS90 | 1.854 | 23.78 |
| 6 | 10.0 | 16.159 | 6.50 | SFPM2 | 1.597 | 67.73 |
| 7 | 12.7 | −13.205 | 0.65 | | | |
| 8 | 12.8 | −10.885 | 1.20 | FDS90 | 1.854 | 23.78 |
| 9 | 16.2 | 51.254 | 7.40 | SFPM2 | 1.597 | 67.73 |
| 10 | 20.3 | −18.016 | 0.50 | | | |
| 11 | 25.8 | 161.099 | 9.90 | SFPL53 | 1.440 | 94.94 |
| 12 | 29.0 | −22.171 | 11.15 | | | |
| 13 | 38.3 | 56.033 | 6.00 | FDS90 | 1.854 | 23.78 |
| 14 | 38.0 | 4721.526 | 6.00 | | | |
| 15 | 35.9 | 26.127 | 6.50 | SNPH1 | 1.816 | 22.76 |
| 16 | 33.9 | 49.952 | 19.81 | | | |
| 17 | 23.6 | −28.664 | 1.50 | SFSL5 | 1.489 | 70.24 |
| 18 | 23.8 | 40.575 | 8.40 | | | |
| 19* | 25.9 | −45.637 | 3.00 | SBAL42 | 1.585 | 59.37 |
| 20* | 27.6 | 96.068 | 6.32 | | | |
| 21 | 31.0 | −201.101 | 8.00 | STIH6 | 1.812 | 25.42 |
| 22 | 32.6 | −25.619 | 0.50 | | | |
| 23 | 29.9 | 29.299 | 6.60 | SLAH53 | 1.810 | 40.93 |
| 24 | 28.1 | 362.374 | 16.55 | | | |
| 25 | 8.5 | 1.00E+13 | 5.11 | | | |
| 26 | 9.8 | −34.603 | 2.00 | STIH4 | 1.761 | 27.51 |
| 27 | 10.6 | 26.606 | 4.20 | SBAL35 | 1.591 | 61.13 |
| 28 | 11.8 | −23.634 | 2.00 | | | |
| 29 | 12.6 | −15.003 | 1.50 | SLAH60 | 1.839 | 37.16 |
| 30 | 16.3 | 26.810 | 8.00 | SFPM2 | 1.597 | 67.73 |
| 31 | 21.6 | −24.598 | 0.50 | | | |
| 32 | 28.0 | 68.959 | 9.50 | SFPM2 | 1.597 | 67.73 |
| 33 | 30.2 | −28.519 | 1.00 | | | |
| 34* | 30.7 | −80.302 | 6.20 | LBAL42 | 1.585 | 59.38 |
| 35* | 32.2 | −28.806 | 2.00 | | | |
| 36 | 40.0 | 1.00E+13 | 35.00 | SBSL7 | 1.518 | 64.14 |
| 37 | 40.0 | 1.00E+13 | 2.00 | | | |
| 38 | 40.0 | 1.00E+13 | 17.70 | SF6 | 1.812 | 25.43 |
| 39 | 40.0 | 1.00E+13 | 0.50 | | | |
| IMG | | | | | | |

| No | 3 | 4 | 19 |
|---|---|---|---|
| R | 54.1841 | 11.2973 | −45.6373 |
| K | 0 | −1.00837 | 0 |
| A | 3.3256E−05 | −1.0809E−05 | 5.1226E−05 |
| B | −5.7900E−08 | 2.9465E−07 | 6.2372E−08 |
| C | 1.2997E−10 | −1.2470E−09 | −1.3124E−09 |
| D | −2.1688E−13 | 4.1291E−12 | −5.1802E−12 |
| E | 1.8817E−16 | −2.4272E−14 | 9.5519E−14 |
| F | −3.0571E−20 | 6.6583E−17 | −3.9461E−16 |
| G | −1.0706E−22 | −6.1009E−20 | 5.8023E−19 |

| No | 20 | 34 | 35 |
|---|---|---|---|
| R | 96.0679 | −80.3019 | −28.8060 |
| K | 0 | 0 | 0 |
| A | 7.4148E−05 | −2.0267E−05 | −6.4477E−06 |
| B | −3.6237E−07 | −3.3623E−08 | −1.7938E−08 |
| C | 1.4207E−09 | 1.2964E−10 | 1.6605E−12 |
| D | −1.3020E−11 | −3.7645E−13 | 6.2699E−13 |
| E | 9.0924E−14 | 1.5451E−15 | −3.2141E−15 |

TABLE 2-continued (Numerical Example 2)
|f| = 7.500 Fno = 3.5 Φ = 29.4 ω = 63.0

| | | | |
|---|---|---|---|
| F | −3.0403E−16 | 1.9887E−18 | 1.0281E−17 |
| G | 3.9255E−19 | −7.2994E−21 | −9.9639E−21 |

TABLE 3

(Numerical Example 3)
|f| = 8.751 Fno = 2.8 Φ = 29.4 ω = 59.2

| Surf | Φea | R | D | glass | Nd | vd |
|---|---|---|---|---|---|---|
| OBJ | | | 840 | | | |
| 1 | 64.5 | 76.951 | 3.50 | STIH6 | 1.812 | 25.42 |
| 2 | 50.4 | 33.995 | 5.20 | | | |
| 3* | 46.5 | 79.064 | 4.00 | LBAL42 | 1.585 | 59.38 |
| 4* | 35.6 | 12.738 | 26.49 | | | |
| 5 | 11.5 | 103.803 | 2.50 | FDS90 | 1.854 | 23.78 |
| 6 | 10.9 | 16.864 | 7.80 | PCD51 | 1.595 | 67.00 |
| 7 | 13.9 | −15.524 | 0.57 | | | |
| 8 | 14.0 | −12.983 | 1.20 | FDS90 | 1.854 | 23.78 |
| 9 | 17.5 | 40.272 | 7.20 | PCD51 | 1.595 | 67.00 |
| 10 | 21.0 | −19.236 | 0.50 | | | |
| 11 | 26.3 | 79.180 | 9.30 | SFPL53 | 1.440 | 94.94 |
| 12 | 28.6 | −24.638 | 18.25 | | | |
| 13 | 37.9 | 60.437 | 5.75 | SNPH1 | 1.816 | 22.76 |
| 14 | 37.7 | −656.264 | 0.50 | | | |
| 15 | 36.1 | 25.611 | 6.50 | STIH6 | 1.812 | 25.42 |
| 16 | 34.0 | 45.980 | 19.90 | | | |
| 17 | 24.3 | −38.862 | 1.50 | SBSL7 | 1.518 | 64.14 |
| 18 | 24.3 | 34.255 | 10.55 | | | |
| 19* | 28.1 | 288.093 | 3.50 | 531100.559 | 1.533 | 55.90 |
| 20* | 29.3 | 41.390 | 7.90 | | | |
| 21 | 32.2 | −131.475 | 7.90 | FDS90 | 1.854 | 23.78 |
| 22 | 33.7 | −26.862 | 0.50 | | | |
| 23 | 29.6 | 20.778 | 7.10 | SLAH66 | 1.776 | 49.60 |
| 24 | 27.0 | 50.363 | 13.64 | | | |
| 25 | 11.1 | 1.00E+13 | 4.95 | | | |
| 26 | 11.0 | −15.246 | 1.30 | STIH6 | 1.812 | 25.42 |
| 27 | 11.9 | 0.000 | 4.20 | SBAL35 | 1.591 | 61.13 |
| 28 | 13.4 | −20.000 | 3.79 | | | |
| 29 | 15.4 | −17.277 | 1.20 | SNBH8 | 1.725 | 34.71 |
| 30 | 19.6 | 30.708 | 8.00 | SBSL7 | 1.518 | 64.14 |
| 31 | 23.9 | −25.435 | 0.50 | | | |
| 32 | 32.3 | 51.638 | 10.50 | PCD51 | 1.595 | 67.00 |
| 33 | 33.8 | −34.360 | 0.80 | | | |
| 34* | 33.8 | −100.132 | 6.20 | LBAL42 | 1.585 | 59.38 |
| 35* | 34.9 | −31.433 | 3.00 | | | |
| 36 | 40.0 | 1.00E+13 | 32.87 | SBSL7 | 1.518 | 64.14 |
| 37 | 40.0 | 1.00E+13 | 2.00 | | | |
| 38 | 40.0 | 1.00E+13 | 17.70 | SF6 | 1.812 | 25.43 |
| 39 | 40.0 | 1.00E+13 | 5.20 | | | |
| IMG | | | | | | |

| No | 3 | 4 | 19 |
|---|---|---|---|
| R | 79.0633 | 12.7383 | 288.0931 |
| K | 0.0000 | −0.6019 | 0.0000 |
| A | 3.0647E−05 | −6.3577E−05 | 6.6390E−05 |
| B | −5.6495E−08 | 3.0741E−07 | −1.6847E−07 |
| C | 1.4268E−10 | −1.3791E−09 | −8.0455E−10 |
| D | −2.5261E−13 | 4.8096E−12 | −5.2939E−12 |
| E | 2.1153E−16 | −2.4438E−14 | 9.4671E−14 |
| F | −2.8793E−20 | 6.5846E−17 | −3.9802E−16 |
| G | −7.8945E−23 | −6.8633E−20 | 5.8023E−19 |

| No | 20 | 34 | 35 |
|---|---|---|---|
| R | 41.3904 | −100.1322 | −31.4332 |
| K | 0.0000 | 0.0000 | 0.0000 |
| A | 8.4774E−05 | −1.8655E−05 | −4.2054E−06 |
| B | −5.1733E−07 | −4.8786E−08 | −2.9125E−08 |
| C | 1.5365E−09 | 2.3689E−10 | 7.6152E−11 |

TABLE 3-continued (Numerical Example 3)
|f| = 8.751 Fno = 2.8 Φ = 29.4 ω = 59.2

| | | | |
|---|---|---|---|
| D | −1.1629E−11 | −6.7464E−13 | 4.3200E−13 |
| E | 8.7673E−14 | 1.6178E−15 | −2.9895E−15 |
| F | −3.0403E−16 | 1.9887E−18 | 9.9719E−18 |
| G | 3.9255E−19 | −7.2994E−21 | −1.0670E−20 |

TABLE 4

| | Numerical Example 1 | Numerical Example 2 | Numerical Example 3 |
|---|---|---|---|
| Focal Length of entire optical system | −8.53 | −7.50 | −8.75 |
| Focal Length fWL of wide-angle lens portion | 28.52 | 69.67 | 26.50 |
| Focal Length fFL of field lens portion | 69.71 | 65.53 | 72.60 |
| Focal Length fRL of relay lens portion | 67.45 | 63.16 | 60.37 |
| Focal Length f1 of positive lens L1 | 68.01 | 66.35 | 68.10 |
| Focal Length f2 of negative lens L2 | −39.85 | −34.11 | −34.90 |
| Focal Length f3 of positive lens L3 | 41.13 | 35.44 | 38.20 |
| Conditions | | | |
| (1)   5 < ν2 − ν1 < 80 | 45.30 | 47.46 | 41.38 |
| (2)   5 < ν2 − ν3 < 80 | 40.40 | 44.81 | 40.36 |
| (3)   0.03 < N1 − N2 < 1.0 | 0.407 | 0.321 | 0.292 |
| (4)   0.03 < N3 − N2 < 1.0 | 0.330 | 0.359 | 0.330 |
| (5)   10 < ν5 − ν3 ≤ 76.15 | 76.15 | 72.19 | 72.19 |
| (6)   10 < ν4 − ν1 < 60 | 25.90 | 15.50 | 25.81 |
| (7)   −10 < SP1 < 0 | −0.67 | −1.02 | −0.83 |
| (8)   0 < SP3 < +10 | 1.63 | 1.29 | 1.51 |
| (9)   0.600 < θgf1 < 0.800 | 0.6495 | 0.6191 | 0.6307 |
| (10)  0.010 < Δθgf1 < 0.050 | 0.0386 | 0.0137 | 0.0261 |
| (11)  0.0 < fWL/fFL < 2.0 | 0.41 | 1.06 | 0.36 |
| (12)  0.0 < fWL/fRL < 2.0 | 0.42 | 1.10 | 0.44 |
| (13)  0.5 < f1/f3 < 3.0 | 1.65 | 1.87 | 1.78 |
| (14)  −2.0 < f2/f3 < −0.5 | −0.97 | −0.96 | −0.91 |
| (15)  0 < ν3 − ν1 < 20 | 4.90 | 2.66 | 1.02 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193387, filed Sep. 18, 2013, which is hereby incorporated by reference herein in their entirety.

What is claimed is:

1. An imaging optical system configured to make a predetermined position on a magnification conjugate side and another predetermined position on a reduction conjugate side conjugate to each other and to form an intermediate image conjugate to both the predetermined positions, the optical system comprising:
a magnification side positive lens disposed on the magnification conjugate side further than an intermediate imaging position where the intermediate image is formed and being convex toward the magnification conjugate side, the intermediate imaging position being located between two points at both of which an off-axis principal ray of a light flux entering the optical system intersects with an optical axis of the optical system;
a reduction side positive lens disposed between the two points and on the reduction conjugate side further than the intermediate imaging position and being convex toward the reduction conjugate side; and
a negative lens disposed between the magnification side positive lens and the reduction side positive lens, wherein the negative lens includes a plurality of lenses and one lens of the plurality of lenses is a particular negative lens disposed closest to the intermediate imaging position, the particular negative lens having a negative power,
wherein:
when the magnification side positive lens, the particular negative lens, and the reduction side positive lens are referred to as a first lens, a second lens and a third lens, respectively, the following conditions are satisfied:

$5 < \nu2 - \nu1 < 80$ $5 < \nu2 - \nu3 < 80$ $0 < \nu3 - \nu1 < 20$ $0.03 < N1 - N2 < 1.0$ $0.03 < N3 - N2 < 1.0$ where ν1 represents an Abbe number of a material of the first lens, ν2 represents an Abbe number of a material of the second lens, ν3 represents an Abbe number of a material of the third lens, N1 represents a refractive index of the material of the first lens, N2 represents a refractive index of the material of the second lens, and N3 represents a refractive index of the material of the third lens.

2. An imaging optical system according to claim 1, wherein the second lens is disposed on the reduction conjugate side further than the intermediate imaging position.

3. An imaging optical system according to claim 1, wherein the second lens includes an aspheric lens.

4. An imaging optical system according to claim 1, wherein the following condition is satisfied:

$0.600 < \theta gf1 < 0.800$ where θgf1 represents a partial dispersion ratio of the material of the first lens; the partial dispersion ratio θgf1 is defined by:

$\theta gf1 = (Ng - Nf)/(Nf - NC)$ where Ng, Nf and NC represent refractive indices of the material of the first lens for a g-line, an f-line and a C-line, respectively.

5. An imaging optical system according to claim 1, wherein the following condition is satisfied:

$0.010 < \Delta\theta gf1 < 0.050$ where Δθgf1 represents an anomalous dispersion of the material of the first lens; the anomalous dispersion Δθgf1 is defined by:

$\Delta\theta gf1 = \theta gf1 - (0.6438 - 0.001682 \times \nu1)$.

6. An imaging optical system according to claim 1, wherein the imaging optical system comprises, in order from the magnification conjugate side to the reduction conjugate side:
a magnification conjugate side lens portion constituting a most-magnification conjugate side portion of the imaging optical system;
a field lens portion including lenses that comprise the first, second, and third lenses; and
a relay lens portion, wherein the following conditions are satisfied:

0<fWL/fFL<2.0

0<fWL/fRL<2.0 where fWL represents a focal length of the magnification conjugate side lens portion, fFL represents a focal length of the field lens portion and fRL represents a focal length of the relay lens portion.

7. An imaging optical system according to claim 1, wherein the following conditions are satisfied:

0.5<f1/f3<3.0

−2.0<f2/f3<−0.5 where f1 represents a focal length of the first lens, f2 represents a focal length of the second lens, and f3 represents a focal length of the third lens.

8. An imaging optical system according to claim 1, wherein the following conditions are satisfied:

−10<SP1<0

0<SP3<+10 where SP1 represents a shape factor of the first lens, and SP3 represents a shape factor of the third lens; the shape factor SP is defined by:

SP=(R1+R2)/(R1−R2)

where R1 represents a curvature radius of a magnification conjugate side lens surface of each lens, and R2 represents a curvature radius of a reduction conjugate side lens surface thereof.

9. An imaging optical system according to claim 1, wherein the imaging optical system comprises, in order from the magnification conjugate side to the reduction conjugate side, a positive lens, a positive lens, a negative lens, a negative lens, and a positive lens.

10. An imaging optical system according to claim 1, further comprising:
  a fourth lens which is a positive lens disposed at the magnification conjugate side further than the first lens and being convex toward the reduction conjugate side; and
  a fifth lens which is a positive lens disposed at the reduction conjugate side further than the third lens and being convex toward the magnification conjugate side,
  wherein the following conditions are satisfied:

10<v5−v3≤76.15

10<v4−v1<60 where v4 represents an Abbe number of a material of the fourth lens, and v5 represents an Abbe number of a material of the fifth lens.

11. An image projection apparatus comprising:
an image projection optical system comprising:
  a light modulation element configured to modulate an entering light; and
  an imaging optical system which is a projection optical system configured to project, onto a projection surface disposed on a magnification conjugate side further than the imaging optical system, a light modulated by the light modulation element disposed on a reduction conjugate side further than the imaging optical system,
  wherein the imaging optical system is configured to make a predetermined position on the magnification conjugate side and another predetermined position on the reduction conjugate side conjugate to each other and to form an intermediate image conjugate to both the predetermined positions, the imaging optical system comprising:
    a magnification side positive lens disposed on the magnification conjugate side further than an intermediate imaging position where the intermediate image is formed and being convex toward the magnification conjugate side, the intermediate imaging position being located between two points at both of which an off-axis principal ray of a light flux entering the imaging optical system intersects with an optical axis of the imaging optical system;
    a reduction side positive lens disposed between the two points and on the reduction conjugate side further than the intermediate imaging position and being convex toward the reduction conjugate side; and
    a negative lens disposed between the magnification side positive lens and the reduction side positive lens, wherein the negative lens includes a plurality of lenses and one lens of the plurality of lenses is a particular negative lens disposed closest to the intermediate imaging position, the particular negative lens having a negative power,
  wherein:
    when the magnification side positive lens, the particular negative lens, and the reduction side positive lens are referred to as a first lens, a second lens and a third lens, respectively, the following conditions are satisfied:

5<v2−v1<80

5<v2−v3<80

0<v3−v1<20

0.03<N1−N2<1.0

0.03<N3−N2<1.0 where v1 represents an Abbe number of a material of the first lens, v2 represents an Abbe number of a material of the second lens, v3 represents an Abbe number of a material of the third lens, N1 represents a refractive index of the material of the first lens, N2 represents a refractive index of the material of the second lens, and N3 represents a refractive index of the material of the third lens.

12. An imaging optical system configured to make a predetermined position on a magnification conjugate side and another predetermined position on a reduction conjugate side conjugate to each other and to form an intermediate image at an intermediate imaging position which is conjugate to both the predetermined positions and which is located between two points at both of which an off-axis principal ray of a light flux entering the optical system intersects with an optical axis of the optical system, the optical system comprising:
  a first positive lens disposed between the two points and on the magnification conjugate side further than the intermediate imaging position and being convex toward the magnification conjugate side;
  a second positive lens disposed between the two points and on the reduction conjugate side further than the intermediate imaging position and being convex toward the reduction conjugate side; and a first negative lens and a second negative lens disposed in order from the intermediate imaging position to the second positive lens, wherein the following conditions are satisfied:

$5 < v2 - v1 < 80$ $5 < v2 - v3 < 80$ $0 < v3 - v1 < 20$ $0.03 < N1 - N2 < 1.0$ $0.03 < N3 - N2 < 1.0$ where v1 represents an Abbe number of a material of the first positive lens, v2 represents an Abbe number of a material of the first negative lens, v3 represents an Abbe number of a material of the second positive lens, N1 represents a refractive index of the material of the first positive lens, N2 represents a refractive index of the material of the first negative lens, and N3 represents a refractive index of the material of the second positive lens.

13. An image projection apparatus comprising:
an image projection optical system comprising:
   a light modulation element configured to modulate an entering light; and
   an imaging optical system which is a projection optical system configured to project, onto a projection surface disposed on a magnification conjugate side further than the imaging optical system, a light modulated by the light modulation element disposed on a reduction conjugate side further than the imaging optical system,
   wherein the imaging optical system is configured to make a predetermined position on the magnification conjugate side and another predetermined position on the reduction conjugate side conjugate to each other and to form an intermediate image at an intermediate imaging position which is conjugate to both the predetermined positions and which is located between two points at both of which an off-axis principal ray of a light flux entering the optical system intersects with an optical axis of the optical system, the imaging optical system comprising:
   a first positive lens disposed between the two points and on the magnification conjugate side further than the intermediate imaging position and being convex toward the magnification conjugate side;
   a second positive lens disposed between the two points and on the reduction conjugate side further than the intermediate imaging position and being convex toward the reduction conjugate side; and
   a first negative lens and a second negative lens disposed in order from the intermediate imaging position to the second positive lens,
   wherein the following conditions are satisfied:

$5 < v2 - v1 < 80$ $5 < v2 - v3 < 80$ $0 < v3 - v1 < 20$ $0.03 < N1 - N2 < 1.0$ $0.03 < N3 - N2 < 1.0$ where v1 represents an Abbe number of a material of the first positive lens, v2 represents an Abbe number of a material of the first negative lens, v3 represents an Abbe number of a material of the second positive lens, N1 represents a refractive index of the material of the first positive lens, N2 represents a refractive index of the material of the first negative lens, and N3 represents a refractive index of the material of the second positive lens.

* * * * *